United States Patent [19]
Dutton

[11] Patent Number: 5,923,887
[45] Date of Patent: *Jul. 13, 1999

[54] INTERRUPT REQUEST THAT DEFINES RESOURCE USAGE

[75] Inventor: Drew J. Dutton, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/650,570

[22] Filed: May 20, 1996

[51] Int. Cl.$^6$ .......................................... G06F 9/46
[52] U.S. Cl. ............................ 395/733; 395/739
[58] Field of Search .................. 395/733, 734, 395/674, 739, 742

[56] References Cited

U.S. PATENT DOCUMENTS

| | | | |
|---|---|---|---|
| 4,750,116 | 6/1988 | Pham et al. | 395/674 |
| 4,794,515 | 12/1988 | Hornung | 395/674 |
| 4,905,196 | 2/1990 | Kirrmann | 365/200 |
| 5,142,684 | 8/1992 | Perry et al. | 395/750 |
| 5,155,854 | 10/1992 | Flynn | 395/733 |
| 5,283,904 | 2/1994 | Carson et al. | |
| 5,317,747 | 5/1994 | Mochida et al. | |
| 5,325,536 | 6/1994 | Chang et al. | |
| 5,381,552 | 1/1995 | Dahlberg et al. | |
| 5,390,329 | 2/1995 | Gaertner et al. | 395/650 |
| 5,475,822 | 12/1995 | Sibigtroth et al. | 395/375 |
| 5,495,615 | 2/1996 | Nizar et al. | |
| 5,530,891 | 6/1996 | Gephardt. | |
| 5,553,305 | 9/1996 | Gregor et al. | 395/826 |
| 5,560,019 | 9/1996 | Narad. | |
| 5,568,649 | 10/1996 | MacDonald et al. | |
| 5,596,728 | 1/1997 | Belmont | 395/281 |
| 5,611,061 | 3/1997 | Yasuda | 395/591 |
| 5,628,027 | 5/1997 | Belmont | 395/821 |
| 5,642,516 | 6/1997 | Hedayat et al. | 395/733 |

*Primary Examiner*—Ayaz R. Sheikh
*Assistant Examiner*—David A. Wiley
*Attorney, Agent, or Firm*—Conley, Rose & Tayon, PC; B. Noel Kivlin

[57] ABSTRACT

An improved programmable interrupt controller for use in a computer system including one or more interrupt service providers (ISPs), usually central processing units (CPUs). At least one CPU and a main memory system are coupled to a host bus. A bus bridge device couples the host bus to the expansion bus. At least one I/O device is coupled to the expansion bus and generates an interrupt request signal. The bus bridge and other bus devices may also generate interrupt request signals. A programmable interrupt controller receives the interrupt requests and provides processor interrupt signals as well as information regarding resource requirements necessary for servicing the interrupts to the one or more CPUs. The programmable interrupt controller also receives interrupt acknowledge signals from the one or more CPUs.

13 Claims, 9 Drawing Sheets

| Status | Vector | Priority | Destination | Mask | Affinity | Type | Enabled |
|--------|--------|----------|-------------|------|----------|------|---------|

Exemplary Interrupt Field

FIG. 9

INTERRUPT REQUEST THAT DEFINES RESOURCE USAGE

BACKGROUND OF THE INVENTION

1. Field of the Invention

The present invention relates to interrupts within a computer system, and more specifically to an interrupt controller for more efficient handling of interrupts in a computer system.

2. Description of the Related Art

A typical computer system contains at least one central processing unit (CPU) and a number of input/output (I/O) devices peripheral to the CPU(s). These I/O devices commonly include hard disk drives, floppy disk drives, video adapters, parallel ports, serial ports, and other similar I/O type devices. An I/O device may need to alert the CPU(s) or request service when it completes a task or has a status change, such as finishing a data transfer, completing an operation, receiving data, or the occurrence of an error condition.

The typical mechanism for an I/O device to request service from the CPU(s) involves an interrupt request. An interrupt request is generally a hardware signal sent from the requesting device to a CPU notifying the CPU that the I/O device requires service. Other system devices such as timers, direct memory access (DMA) controllers, and other processors may generate interrupt request signals.

One advantage of using interrupts over other techniques, such as polling, is that the CPU is free to perform other operations between interrupts. When a CPU receives an interrupt request, it stops executing the current instruction routine, saves its state, clearing all its registers, and jumps to an interrupt service routine. The interrupt service routine includes instructions specific to the device requesting the interrupt so that the CPU can respond to the device condition or status change that instigated the interrupt request. When the interrupt service routine is completed, the CPU restores its state and returns to its location prior to the interrupt.

Referring to FIG. 1, a computer system 100 utilizing interrupts is shown according to the prior art. The computer system 100 includes a CPU 110, and a main memory system 120 coupled to a host bus 180. The main memory system 120 typically includes a memory controller and system memory (not shown). A bus bridge 140 is coupled to the host bus 180 and an expansion bus 190 and typically includes a DMA controller (not shown). The expansion bus 190 typically conforms to a popular bus standard such as the Industry Standard Architecture (ISA), Extended Industry Standard Architecture (EISA), Microchannel Architecture (MCA), or Peripheral Component Interconnect (PCI). Alternatively, multiple expansion buses are included, such as a PCI bus further coupled to an ISA bus. Several I/O devices 150, 160, 170 are coupled to the expansion bus 190. The I/O devices 150, 160, 170 are typically devices such as a floppy disk drive, video adapter, parallel port, or other devices as are well known in the art.

The bus bridge 140 and the I/O devices 150, 160, 170 generate interrupt requests 142, 152, 162, 172, respectively, to notify the CPU 110 that service is needed. The interrupt requests 142, 152, 162, 172 are collected by a programmable interrupt controller (PIC) 130. The programmable interrupt controller 130 is coupled to the host bus 180. Generally, when the programmable interrupt controller 130 receives one of the interrupt requests 142, 152, 162, 172 it sends an interrupt signal 132 to the CPU 110. When the CPU 110 receives the interrupt signal 132, it finishes its current operation, saves its current state, and sends an interrupt acknowledge 112 to the programmable interrupt controller 130. When the programmable interrupt controller 130 receives the interrupt acknowledge 112 it sends an interrupt vector to the CPU 110 over the host bus 180. The interrupt vector indicates the location of the appropriate interrupt service routine to the CPU 110.

Generally speaking, in a typical system, the interrupt request does not provide the interrupt service provider with any information regarding system usage, such as functional units, registers, buses and other sub-systems that must be available to service the device. In the absence of such information, current systems do not optimize the system workload in servicing interrupts. For example, the interrupt service provider, typically a CPU, will save all of its registers prior to servicing an interrupt and restore all such registers upon end of interrupt. For some situations, the saving of State information for certain registers is unnecessary. In addition, information concerning internal system resources such as those relating to address translation units, memory mapping, clock rates and the like, may be provided. Finally, information concerning external resources such as clock speed on buses, power states may be provided.

Consequently, there is a need to provide resource information to an interrupt service provider so as to optimize interrupt response and avoid needless storage of State information and to prepare system resources that are necessary in servicing the interrupt.

SUMMARY OF THE INVENTION

The present invention provides an improved programmable interrupt controller for use in a computer system including one or more interrupt service providers (ISPs), usually central processing units (CPUs). At least one CPU and a main memory system are coupled to a host bus. A bus bridge device couples the host bus to the expansion bus. At least one I/O device is coupled to the expansion bus and generates an interrupt request signal. The bus bridge and other bus devices may also generate interrupt request signals. A programmable interrupt controller receives the interrupt requests and provides processor interrupt signals as well as information regarding resource requirements necessary for servicing the interrupts to the one or more CPUs. The programmable interrupt controller also receives interrupt acknowledge signals from the one or more CPUs.

One embodiment of the programmable interrupt controller includes an interrupt request interface, a validity checker, one or more processor interfaces and a storage unit for storing a bit map of resources to be used for service of the interrupt. Interrupt requests are received by the interrupt request interface, processed, and sent to the appropriate processor interface. The validity checker monitors the state of the interrupt request signals to assure the interrupts remain valid throughout processing. Valid interrupt requests are issued to one of the one or more CPUs by the appropriate processor interface asserting a processor interrupt signal. At the same time, the storage unit transmits the resource usage information along the data bus to the ISP. The ISP responds, for example, by saving only those registers needed to service the interrupt. The ISP further responds to the processor interrupt with an interrupt acknowledge which is received by the appropriate processor interface on the corresponding interrupt acknowledge signal.

In an alternative embodiment, the storage unit is accessed by the programmable interrupt controller and provided to the ISP during the interrupt acknowledge sequence rather than during the interrupt request sequence.

Another embodiment of the present invention provides a storage unit within the interrupt controller for receiving interrupt resource information along with the interrupt requests by I/O devices. In the alternative, this information could be loaded into the programmable interrupt controller at any time prior to the interrupt actually being serviced by the interrupt service provider.

Still another embodiment of the present invention employs an interrupt information bus. The interrupt information bus is coupled between the I/O devices that request the interrupt and the interrupt service provider. Prior to servicing the interrupt, for example, immediately before returning the interrupt acknowledge signal, the ISP will upload the information along the interrupt information bus. Alternatively, the bus could be coupled between the interrupt controller and the interrupt service provider.

Yet another embodiment of the present invention employs an interrupt information buffer. Under this technique, information can be provided in any accessible memory location, including main memory, system logic, or the requesting device. Preferably, a separate storage location is provided for each separate interrupt request.

Yet another embodiment of the claimed invention encodes the resource information into a fixed set of resource classes. Under this technique, interrupts that use the same set of resources are collected together and assigned to one resource class. A single code can then be sent to identify this class of resource usage. The class encoding information can then be transmitted using any of the aforementioned methods or possibly using dedicated protocol signals, for example, serially.

BRIEF DESCRIPTION OF THE DRAWINGS

A better understanding of the present invention can be obtained when the following detailed description of the preferred embodiment is considered in conjunction with the following drawings, in which:

FIG. 9 illustrates an exemplary information field according to one embodiment of the present invention.

Figure 1:
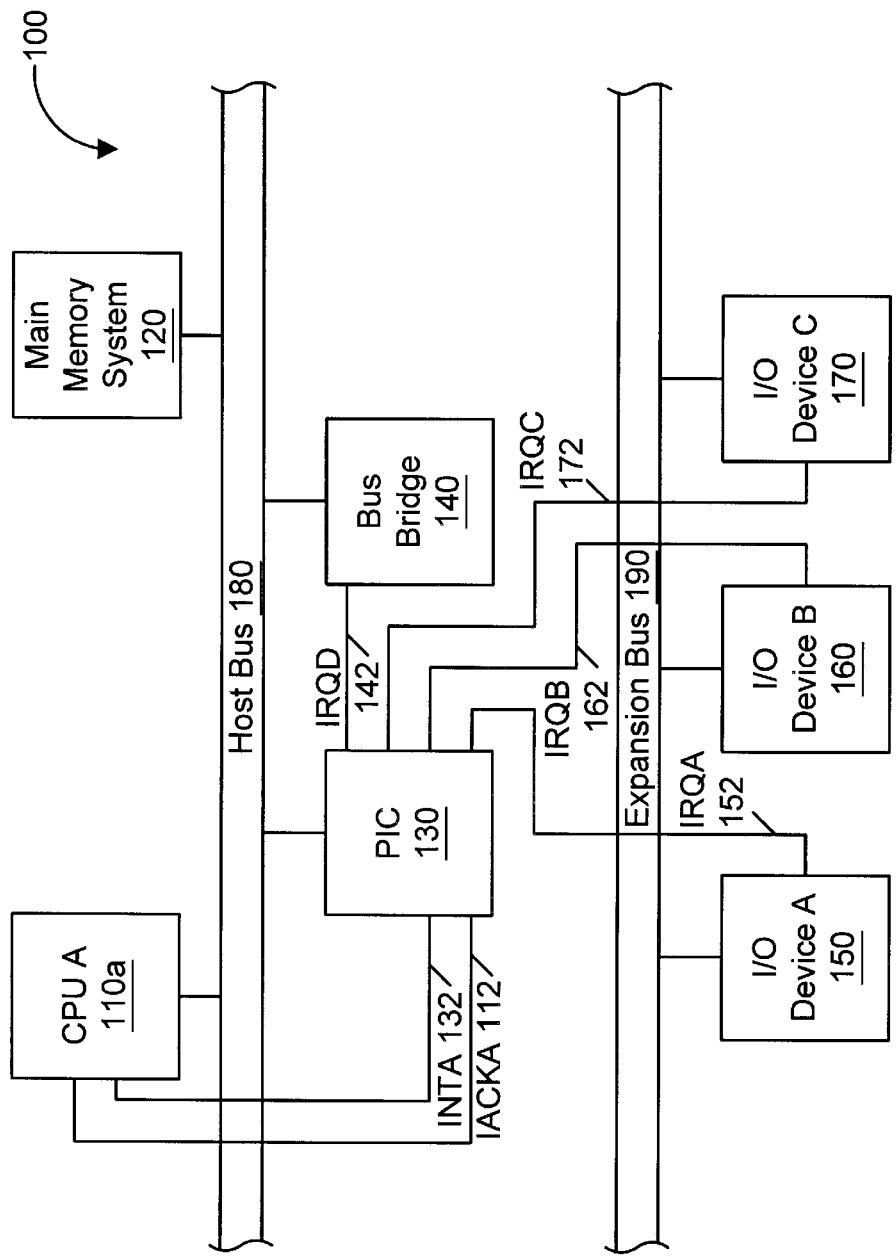
FIG. 1 is a block diagram illustrating a computer system with a programmable interrupt controller according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
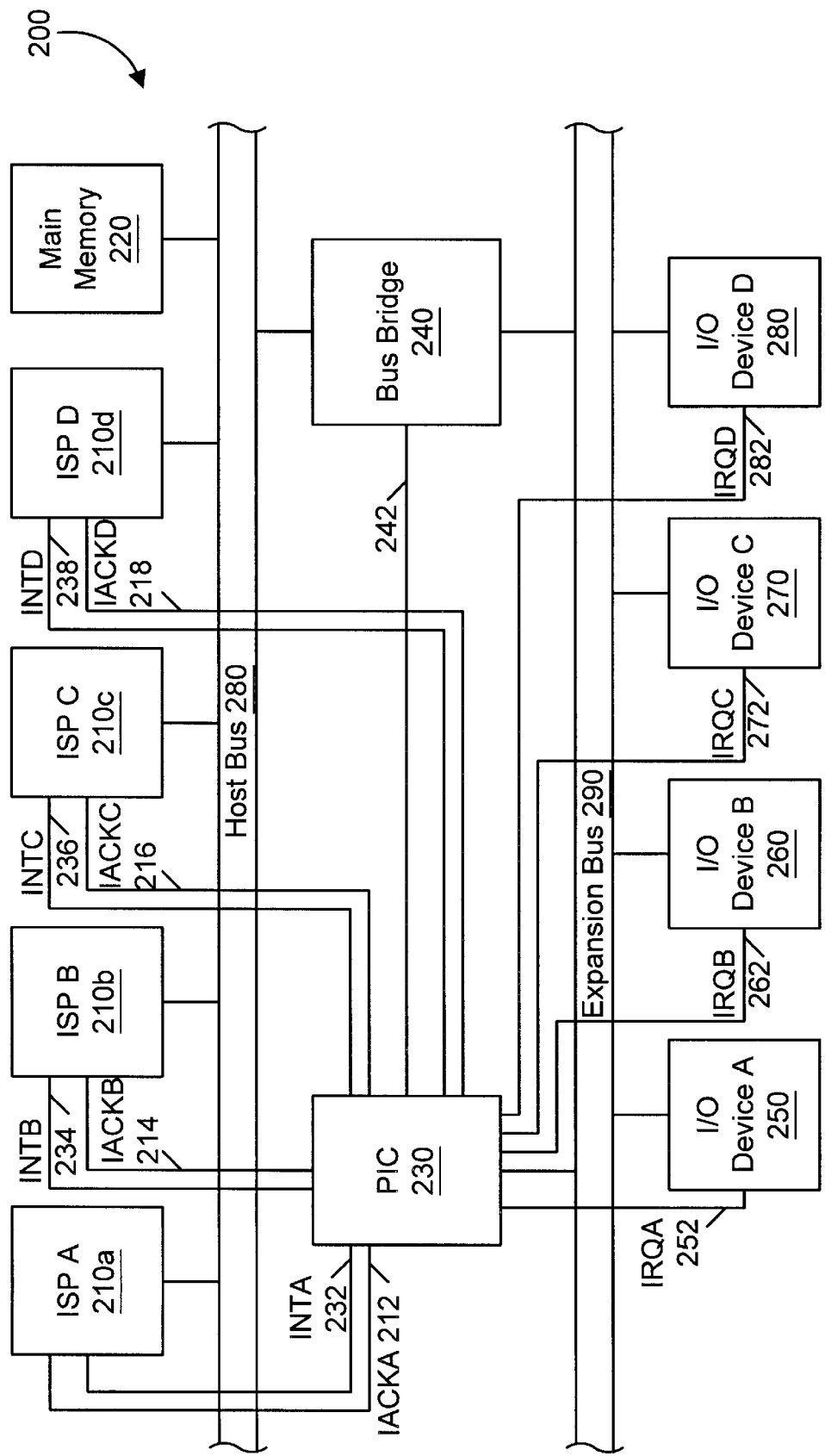
FIG. 2 is a block diagram illustrating a computer system with a programmable interrupt controller according to one embodiment of the present invention.

Referring now to the drawings, FIG. 2 is a block diagram of a computer system 200 including a programmable interrupt controller 230 that can employ the present invention. The computer system includes interrupt service providers (ISPs) 210a, 210b, 210c, and 210d, each coupled to a host bus 280, and a main memory system 220 coupled to the host bus 280. The ISPs may be central processing units (CPUs). The main memory system 220 includes a memory controller and system memory (not shown). A bus bridge 240 is coupled to the host bus 280 and an expansion bus 290. The expansion bus 290 conforms to a popular bus standard such as the Industry Standard Architecture (ISA), Extended Industry Standard Architecture (EISA), Microchannel Architecture (MCA), or Peripheral Component Interconnect (PCI). In other embodiments of the invention, multiple expansion buses are included, such as a PCI bus further coupled to an ISA bus. Several I/O devices 250, 260, 270, 280 are coupled to the expansion bus 290. The I/O devices 250, 260, 270, 280 are typically devices such as a floppy disk drive, video adapter, parallel port, or other devices as are well known in the art. It should be noted that in other embodiments, the number of processors and I/O devices are not necessarily equal. In other embodiments, different types and different numbers of I/O devices may be present.

The bus bridge 240 and the I/O devices 250, 260, 270 generate interrupt requests 242, 252, 262, 272, respectively, to notify one of the ISPs 210a, 210b, 210c, 210d that service is needed. The interrupt requests 242, 252, 262, 272 are collected by a programmable interrupt controller (PIC) 230. The programmable interrupt controller 230 is coupled to the expansion bus 290. Alternatively, the programmable interrupt controller 230 could be coupled to the host bus 280. When the programmable interrupt controller 230 receives one of the interrupt requests 242, 252, 262, 272 it determines whether or not to send an ISP interrupt signal 232, 234, 236, 238 to one of the ISPs 210a, 210b, 210c. Additionally, the programmable interrupt controller 230 receives interrupt acknowledge signals 212, 214, 216, 218 from the ISPs 210a, 210b, 210c, 210d, respectively. The programmable interrupt controller 230 may provide a interrupt vector to one of the ISPs 210a, 210b, 210c, 210d over the host bus 280. The interrupt vector indicates the location in memory of an interrupt service routine for handling the event that initiated the corresponding interrupt request. The programmable interrupt controller 230 is responsible for other interrupt management tasks as well. For example, the programmable interrupt controller 230 may supervise the transmission of interrupt resource information to the interrupt service providers. A more detailed description is given below for one embodiment of the programmable interrupt controller 230.

Figure 3:
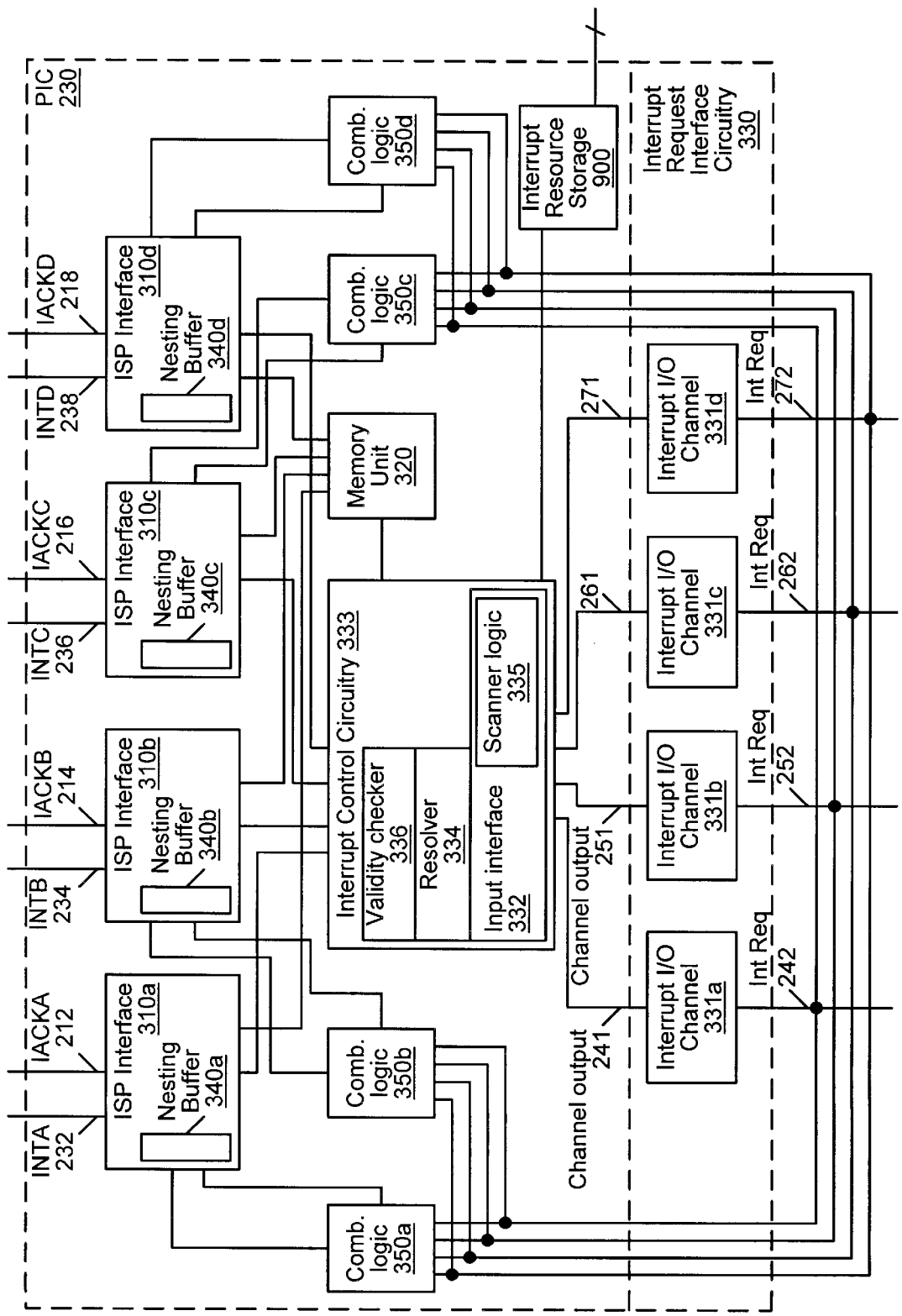
FIG. 3 is a block diagram of the programmable interrupt controller according to one embodiment of the present invention.

Referring now to FIG. 3, a block diagram is shown illustrating one embodiment of the programmable interrupt controller 230. The programmable interrupt controller 230 includes interrupt request interface circuitry 330 coupled to interrupt control circuitry 333. Interrupt request interface circuitry comprises a plurality of interrupt I/O channels 331a, 331b, 331c, and 331d corresponding to interrupt request lines 242, 252, 262, and 272. Interrupt control circuitry 333 includes an input interface 332, a resolver 334, and a validity checker 336. Central interrupt control circuit 333 is further coupled to a plurality of ISP interface channels 310a, 310b, 310c, and 310d. Each ISP interface channel 310a, 310b, 310c, 310d includes a nesting buffer 340a, 340b, 320c, and 340d, respectively, for storing interrupt requests. The request lines 242, 252, 262 and 272 are each coupled to the inputs of combinatorial logic units 350a, 350b, 350c, 350d. The outputs and control lines of combinatorial logic units 350a, 350b, 350c and 350d are, in turn, coupled to ISP interface channels 310a, 310b, 310c, and 310d, respectively. Central control circuit 333 and ISP interface channels 310a, 310b, 310c, and 310d are each coupled to memory unit 320. Programmable interrupt controller 230 also includes interrupt resource storage 900 coupled to interrupt control circuitry 333. When an interrupt request is presented to an interrupt service provider, or during reception of the interrupt acknowledge signal from an interrupt service provider, interrupt resource storage 900 is accessed, transmitting interrupt resource information along the bus data lines to the interrupt service provider. The information can be encoded as a bit map of the resources to be used. Such interrupt resource information can include either internal or external CPU resources. External resources can include, for example, clock speed on buses, power states and the like. Internal resource information can include information concerning memory mapping, address translation, and internal CPU clock rates, among other things. It is to be noted that these lists are non-exclusive and exemplary only.

In an alternative embodiment, interrupt resource information is collected and stored in the programmable interrupt controller at any time before, during or after issuing the interrupt request. Again, the information is transferred along the data lines. In a still alternate embodiment, the interrupt resource information may be provided directly on the data lines from an interrupt requester to the appropriate interrupt service provider, either with the request or during the acknowledge cycle.

Figure 4:
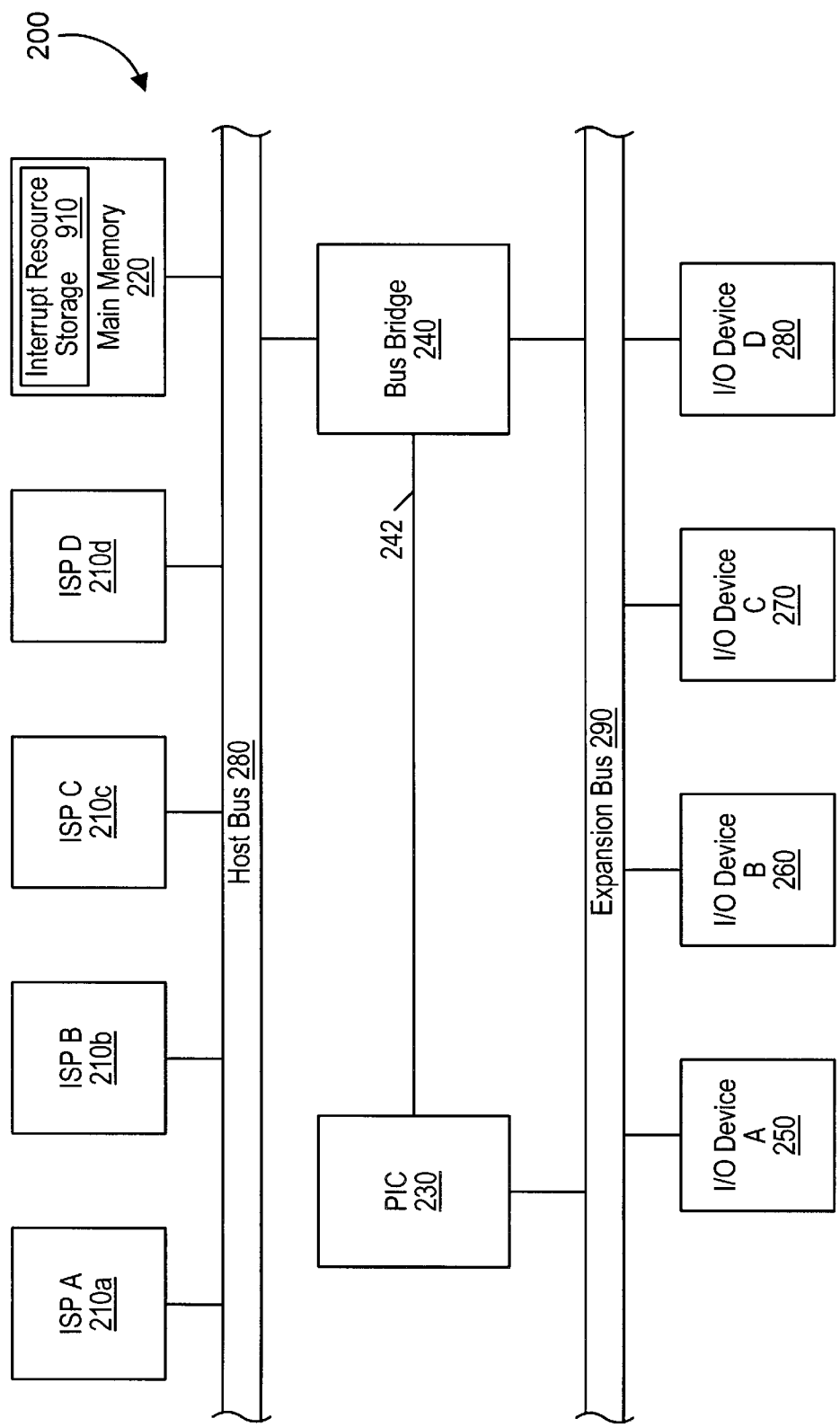
FIG. 4 is a block diagram of a computer system according to one embodiment of the present invention.
Figure 5:
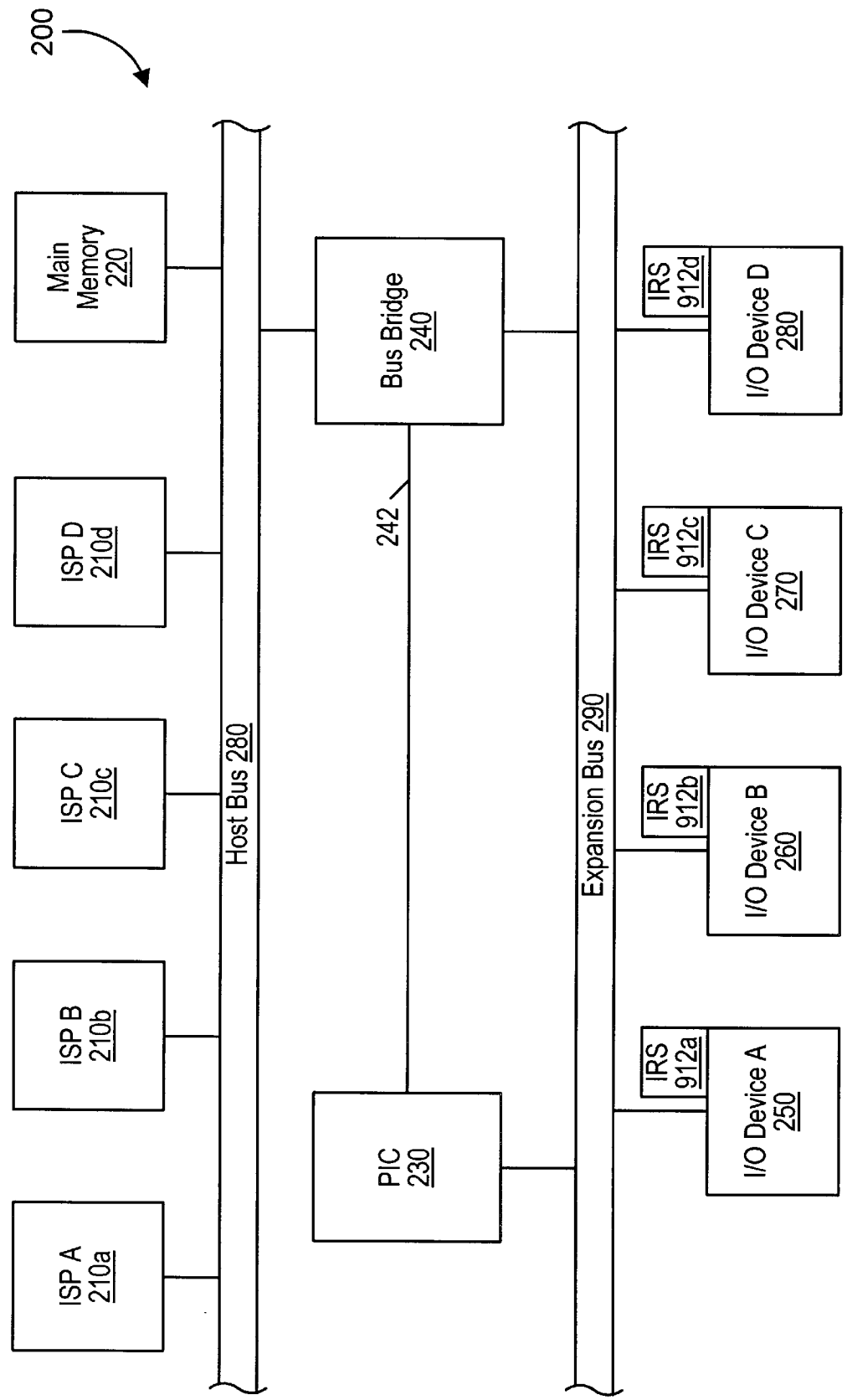
FIG. 5 is a block diagram of a computer system according to one embodiment of the present invention.

Turning now to FIG. 4, interrupt resource storage (IRS) 910 may be configured as part of main memory 220. Alternatively, interrupt resource storage may be provided in the I/O devices 250, 260, 270, 280 themselves. Thus, turning now to FIG. 5, interrupt resource storage 912a, 912b, 912c and 912d is provided to I/O devices 250, 260, 270 and 280, respectively. The interrupt resource information is transmitted across bus bridge 240 to ISP's 210a, 210b, 210c and 210d.

If several types of interrupts employ the same set of system resources, the set may be assigned to one resource class. Thus, a single code can be sent to identify the particular class of resource usage. The code and class can then be transmitted as described above, or using dedicated protocol signals (e.g., serially). A preferred system has a separate storage location for each separate interrupt request number.

Figure 6:
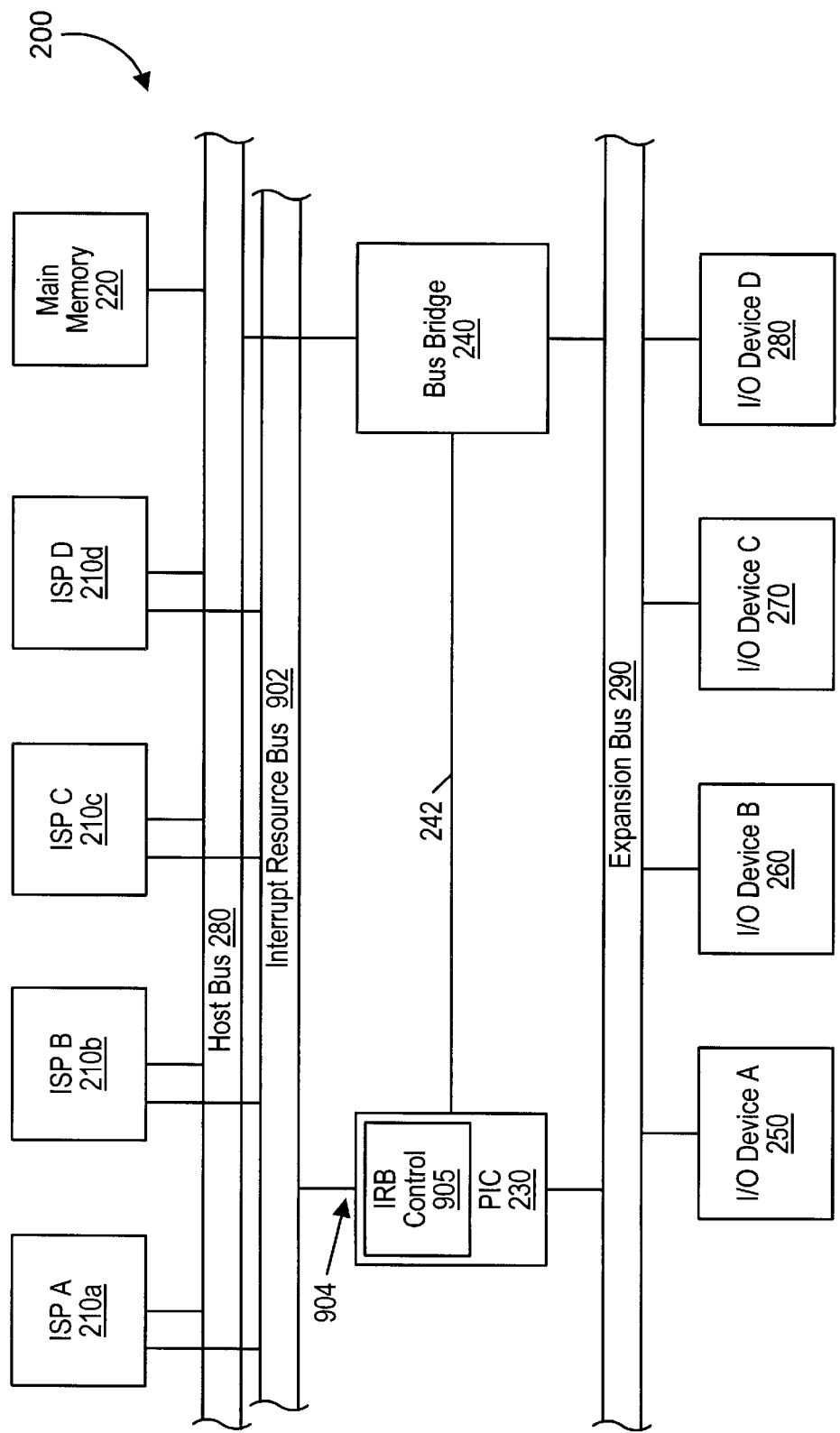
FIG. 6 is a block diagram of a computer system according to one embodiment of the present invention.
Figure 7:
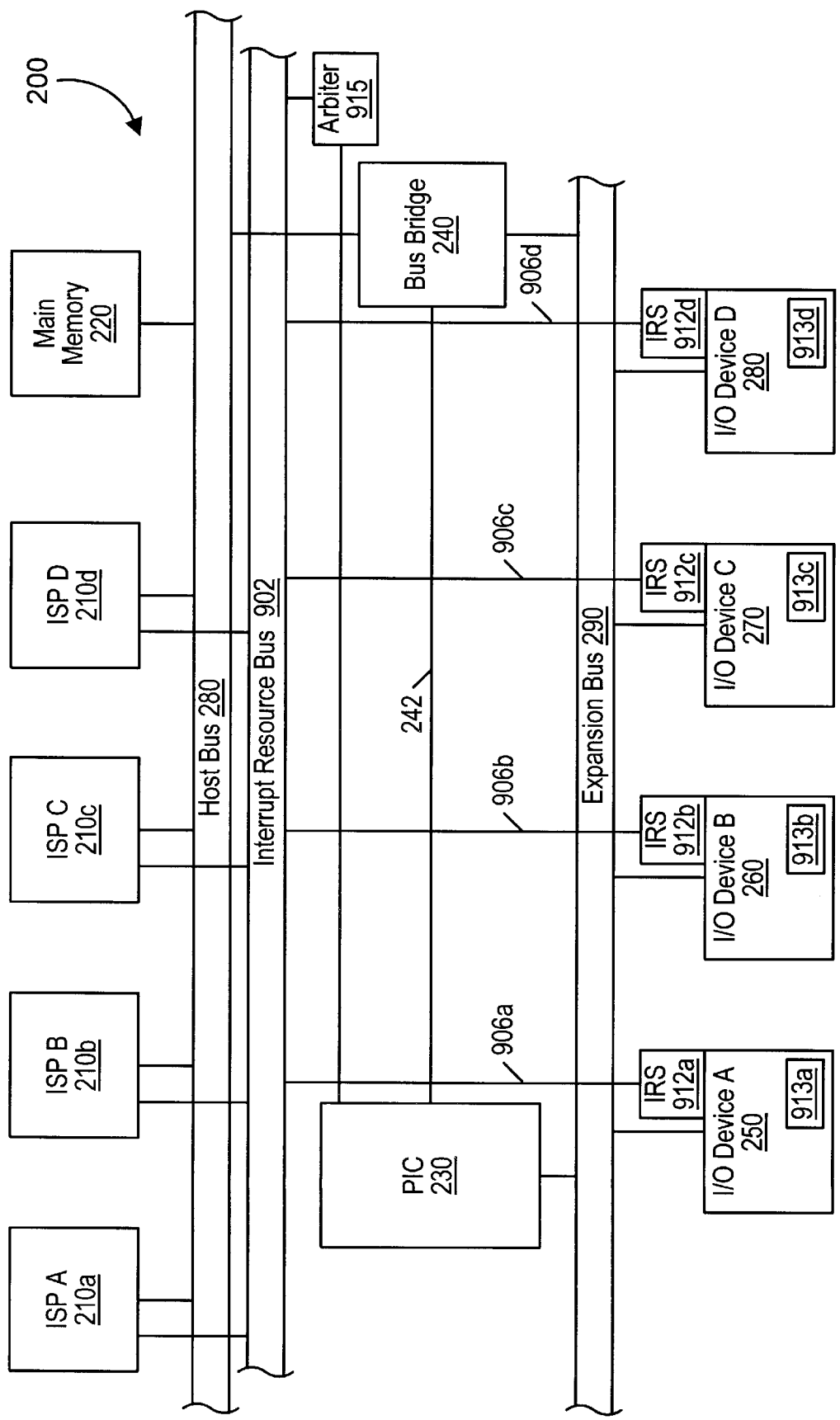
FIG. 7 is a block diagram of a computer system according to one embodiment of the present invention.

Turning now to FIG. 6, interrupt resource information may be provided from interrupt controller 230 across an interrupt resource bus 902 rather than across data lines of host bus 280 or expansion bus 290. In this embodiment, interrupt controller 230 includes interrupt resource bus control 905. Alternatively, I/O devices 250, 260, 270 and 280 may provide the interrupt resource information directly to the interrupt resource bus 902 (See FIG. 7). In such an embodiment I/O devices 250, 260, 270 and 280 include interrupt resource bus controls 913a, 913b, 913c and 913d, as well as interrupt resource storage 912a, 912b, 912c and 912d, respectively. An arbiter 915 coupled to interrupt controller 230 arbitrates bus mastership.

The interrupt request interface circuitry 330 receives the interrupt requests from the I/O devices along interrupt request lines 242, 252, 262, 272. The ISP interfaces 310a, 310b, 310c, 310d provide the ISP interrupt signals 232, 234, 236, 238, respectively; and receive the interrupt acknowledge signals 212, 214, 216, 218, respectively.

Interrupt request interface circuitry 330 comprises a plurality of interrupt I/O channels, 331a, 331b, 331c, and 331d. Each interrupt I/O channel outputs a logical high to central control circuit 333 upon a change of state (i.e., upon receipt or cancellation of an interrupt request). For example, if an edge-triggered interrupt is received on interrupt request line 242, interrupt I/O channel 331a will output a logical high along channel output line 241. Control circuit 333 will then proceed to process the interrupt request by marking the request as active (as will be discussed in more detail below) and deasserting channel output line 241. Upon reception of the next rising edge, the I/O channel will again output a logical high along channel output line 241. If a level-triggered interrupt is received on interrupt request line 242, interrupt I/O channel 331a will again cause channel output line 241 to be asserted high, causing central control circuit 333 to mark the request as active and process it. Again, the central control circuit 333 will deassert output line 241. If interrupt request line 242 goes low, indicating the deassertion of the interrupt, interrupt I/O channel 331a will again assert line channel output 241 high. Central control circuit 333 will note that the interrupt was marked as active and will read the deassertion of the interrupt, clearing the interrupt as will be discussed in more detail below. Central control circuit 333 will again deassert channel output line 241.

Input interface 332 of central control circuit 333 includes scanner logic 335 which scans each channel output 241, 251, 261, and 271 of each interrupt I/O channel 331a, 331b, 331c, and 331d. In one embodiment, scanner logic 335 comprises a state machine which polls each channel output line 241, 251, 261, 271 in round-robin fashion. When an active interrupt request is detected by the input interface 332 on one of the channel output lines 241, 251, 261, 271, the central control circuitry 333 associates a status and a priority level with the interrupt request. This information, as well as other interrupt information, is stored as a field in the programmable interrupt controller 230 for each interrupt request.

In one embodiment, memory unit 320 is a random access memory (RAM). An exemplary field is shown in FIG. 9. The information field includes a state, an interrupt vector, a priority level, a destination, a mask indication, an affinity indication, whether the interrupt is edge or level triggered, and whether the interrupt is enabled or disabled. The state may indicate if the interrupt request is active, idle, in-service, or pending. The interrupt vector indicates the location of an interrupt service routine in main memory for a CPU to execute in order to handle the situation which initiated the interrupt request. The priority level is used to decide which interrupt requests are issued to a CPU first. The destination information may be used to specify to which ISP an interrupt request should be issued. The mask indication may be used to block a particular interrupt request from issuing to an ISP. The affinity indicator may show which ISP most recently executed the interrupt and may be used in conjunction with the destination information to determine which processor should receive the interrupt.

The central interrupt control circuitry 333 accesses the information stored in the memory unit 320 by generating read cycles to the memory unit 320 and by means of a unique interrupt identification code assigned to each interrupt request. For the currently selected interrupt request, the central interrupt control circuitry 333 reads the associated information field from the memory unit 320. Based on the current state of the input (242, 252, 262, or 272) for the currently selected interrupt request and associated information read from the memory unit 320, the central interrupt control logic 333 determines the next state for the selected interrupt request. The next state is then stored in the memory unit 320. The mask, priority level, and previous state information may be used by the central interrupt control logic 333 to determine the next state for the selected interrupt request. The next state may indicate if the interrupt request is valid, idle, in-service, or pending.

The central interrupt control circuitry 333 accesses the associated information in the memory unit 320 for the current interrupt request, and resolver 334 determines, according to the destination and affinity information, to which ISP interface 310a, 310b, 310c, or 310d the interrupt is to be sent. A particular ISP may be specified, or the interrupt may be sent to an ISP based on which one serviced it most recently (and hence might still have its service routine stored in cache).

Figure 8:
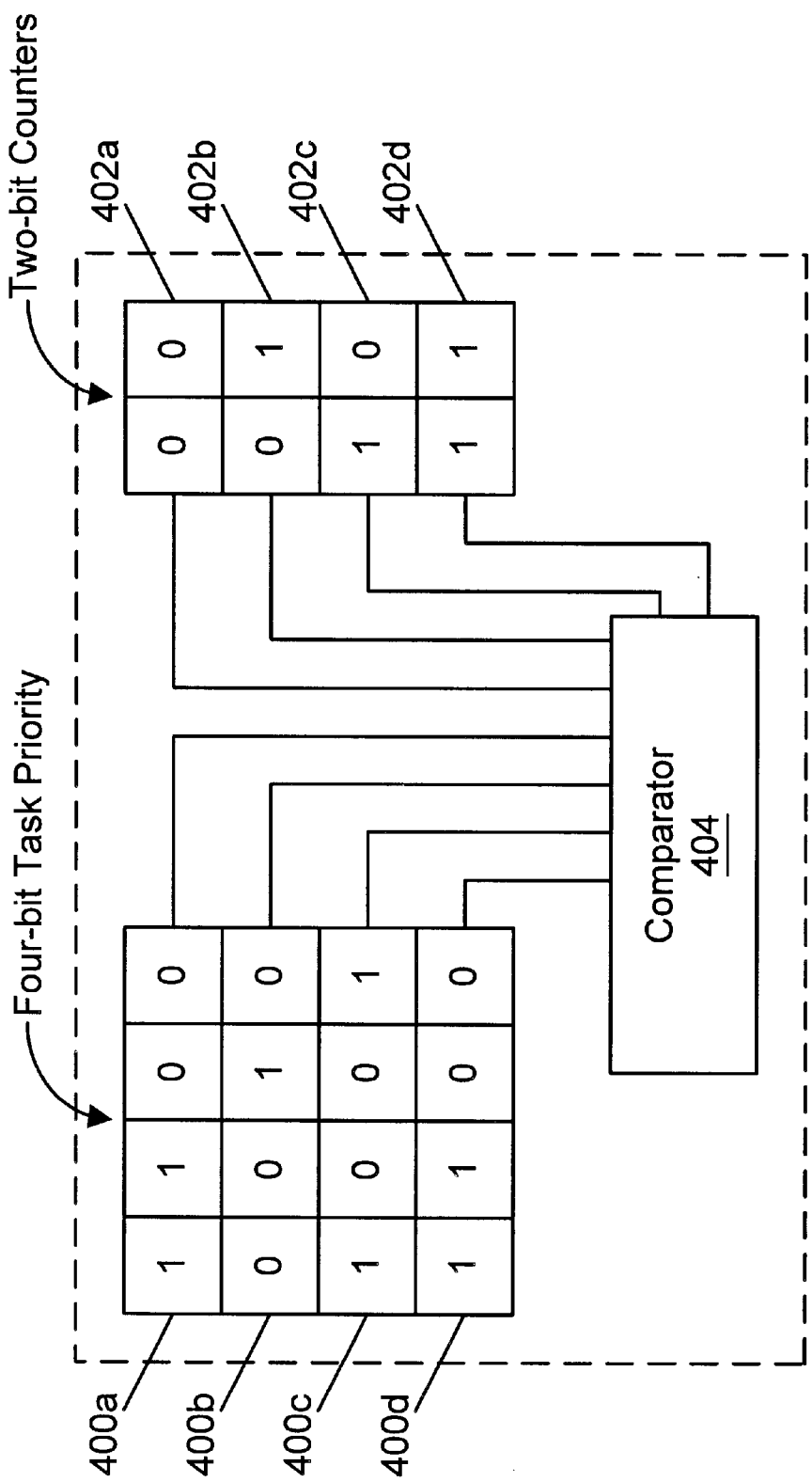
FIG. 8 illustrates a task priority resolution scheme according to one embodiment of the present invention.

In one embodiment, the interrupt is also routed to the ISP based on a task priority, indicating which ISP is executing the lowest priority task. The interrupt is routed to the ISP having the lowest task priority. For example, FIG. 8 shows a schematic representation of the task priority resolution process. In the exemplary system having four ISPs, the priority level of each device is represented by a four-bit binary number 440a, 400b, 400c, 400d, thereby allowing for sixteen task priority levels. If more than one device shares the same task priority, then the routing is made substantially randomly among the devices sharing the task priority level. This is accomplished through the use of a two-bit field 402a, 402b, 402c, 402d that is appended to the four-bit task priority number. The additional two bits function as the least significant bits in the resulting six-bit number. When the four-bit task priorities are identical, the remaining two bits are used to randomly route the interrupt. A comparator is also provided, to select the smallest six-bit number. For example, 400a and 400d show identical task priorities. Their corresponding two-bit extensions 400a, 402a are different. Accordingly, the comparator 404 will select the device corresponding to 400a and 402a.

So long as the two additional bits 402a, 402b, 402c, 402d are guaranteed to be different, the six-bit priority numbers will be different, even if the original four-bit task priority numbers 400a, 400b, 400c, 400d are the same. To ensure that a different device is selected at the next arbitration, the two-bit numbers 402a, 402b, 402c, 402d are updated after every arbitration. Accordingly, in one embodiment, the two-bit number fields are implemented as two-bit binary counters. The counters are initialized at start-up to ensure that each CPU is assigned a different two-bit number. After every arbitration, each counter is incremented synchronously and wrapped-around, if necessary. This ensures that the counters will always contain different values. It should be noted that on the two-bit number, as well as the four-bit number, may be stored in memory unit 320. Alternatively, the two- and four-bit numbers may be stored in resolver 334.

Once the interrupt has been assigned to a particular ISP, the appropriate ISP interfaces 310a, 310b, 310c, or 310d use the associated information for the current interrupt request to determine if and when to issue the interrupt request to an ISP by driving the corresponding ISP interrupt request 232, 234, 236, or 238 active. The priority level information may be used to determine when the selected interrupt request will issue to a ISP. The appropriate ISP interface 310a, 310b, 310c, or 310d may update the associated information in the memory 320 by accessing the memory unit 320 through the central interrupt control circuitry 333 in response to the appropriate interrupt acknowledge 212, 214, 216, 218 and end of interrupt being received. For example, the state information may be updated to in-service after an interrupt acknowledge is received or to idle after an end of interrupt is received.

Once the interrupt request has been routed to the appropriate ISP interface 310a, 310b, 310c, or 310d, the unique identification code for the current interrupt request is stored in an entry in the interrupt nesting buffer 340a, 340b, 340c, or 340d of the appropriate ISP interface 310a, 310b, 310c, 310d. In one embodiment, nesting buffers 340a, 340b, 340c, 340d need only store the interrupt identification according to priority. The remaining interrupt information may be referenced from memory unit 320. The nesting buffers 340a, 340b, 340c, or 340d each have a number of entries at least equal to the number of different interrupt priority levels. Each entry corresponds to a priority level. The priority level is used to determine when the interrupt request will issue. The highest priority interrupt requests held in each of the ISP interfaces 310a, 310b, 310c, 310d are issued first. Lower priority interrupt requests are held until they become the highest priority interrupt request. If a lower priority interrupt is currently being serviced, the higher priority interrupt will be given to the ISP. The former, lower priority interrupt will resume only after the higher priority interrupt has been completed. Thus, the maximum number of interrupts that may be given to a ISP at a given time is equal to the number of distinct priority levels supported by the system. Consequently, in one embodiment, the nesting buffers 340a, 340b, or 340c each have a number of entries equal to the number of different interrupt priority levels.

Determining when an interrupt request will issue based on priority is also referred to as resolving interrupt priority. The central interrupt control circuitry 333 uses the priority from the corresponding interrupt information to determine in which entry of the nesting buffer 340a, 340b, 340c, 340d the unique interrupt identification code is stored. The entry is marked as busy when a unique interrupt identification code is stored in the entry.

Each ISP interface 310a, 310b, 310c, 310d uses the unique interrupt identification code for the highest priority active entry in its respective interrupt nesting buffer 340a, 340b, 340c, 340d to access the corresponding interrupt information from the memory unit 320. In conjunction with validity checker 336, each ISP interface 310a, 310b, 310c, 310d uses the corresponding accessed information to determine if the corresponding interrupt request should be issued. For example, if the interrupt request is determined to be no longer valid, or is masked, the interrupt request may not issue to a CPU. More particularly, an ISP interface 310a, 310b, 310c, 310d may determine to void the corresponding interrupt request if the accessed information indicates that the corresponding interrupt request has become invalid while its unique interrupt identification code was pending in a nesting buffer 340a, 340b, 340c, 340d waiting to become highest priority. This period of waiting is referred to as interrupt latency. This latency may be relatively large, especially for low priority interrupt requests. The validity checker 320 monitors the validity of the interrupt requests stored within the ISP interfaces 310a, 310b, 310c, and 310d. If an interrupt request becomes invalid before it issues, the validity checker 320 indicates an invalid state for the interrupt request to the appropriate ISP interface 310a, 310b, 310c, and 310d to the central interrupt control circuitry 333. Thus, the invalid interrupt request is cleared (canceled) before it needlessly issues. In that case, the interrupt status in memory unit 320 is updated to idle. In one embodiment, the validity checker 336 monitors the condition of each input 241, 251, 261, and 271 to the scanner 335. If one of the interrupt request signals 242, 252, 262, 272 changes from active to inactive before the corresponding interrupt request issues to the ISP, then the validity checker 336 determines the interrupt request to be invalid. It is noted that in other embodiments, different methods and criteria may be used to determine the validity of an interrupt request.

When an interrupt request becomes the highest priority interrupt request in one of the ISP interfaces 310a, 310b, 310c, 310d, the appropriate ISP interface 310a, 310b, 310c, 310d issues the interrupt request to the corresponding ISP by driving active the appropriate ISP interrupt signal 232, 234,236, 238. Interrupt resource storage 900 may be accessed at this time, to send to the appropriate ISP the resource information that will be required to service the interrupt. The validity checker 336 continues to monitor the validity of the interrupt request as described above. If the validity checker 336 determines that the interrupt request has become invalid before the ISP responds (i.e., by returning the interrupt acknowledge signal), then the interrupt request is cleared as described above and the appropriate ISP interface 310a, 310b, 310c, 310d drives inactive the corresponding ISP interrupt signal 232, 234, 236, or 238. Thus, the ISP may be prevented from needlessly responding to an invalid interrupt request.

If the interrupt request stays valid and an ISP responds by driving one of the interrupt acknowledge signals 212, 214, 216, 218 active, the corresponding ISP interface 310a, 310b, 310c, 310d receives the active interrupt acknowledge signal 212, 214, 216, 218 from the corresponding ISP. In one embodiment, the resource information is transmitted from interrupt resource storage 900 during the interrupt acknowledge cycle. Also, the corresponding entry in the appropriate interrupt nesting buffer 340a, 340b, 340c, 340d is marked as in-service. The validity checker continues to monitor the validity of the corresponding interrupt request. If the request is valid at this point, the appropriate ISP interface 310a, 310b, 310c, 310d sends the corresponding interrupt vector over the host bus 280 to the ISP. The ISP executes the interrupt routine indicated by the interrupt vector and returns an end of interrupt (EOI) command to the programmable interrupt controller 230 over the host bus 280. When the appropriate ISP interface 310a, 310b, 310c, 310d receives the EOI command, the interrupt request is cleared. The status for the corresponding interrupt request is then changed to idle to indicate that the corresponding interrupt request signal 242, 252, 262, 272 input is available for a new interrupt request. Finally, the next highest priority interrupt request is processed as described above, the appropriate ISP interface 310a, 310b, 310c, 310d accessing the interrupt information referenced by the unique interrupt identification code from the corresponding entry of the appropriate interrupt nesting buffer 340a, 340b, 340c, 340d.

Because of the interrupt latency problem, it is possible for the interrupt request to become invalid before the appropriate ISP interface 310a, 310b, 310c, 310d is ready to send the corresponding interrupt vector, but after the acknowledge interrupt has been received. More particularly, as discussed above, the validity checker circuit monitors the interrupt lines 241, 251, 261, 271, which are polled by scanner 332 on a round-robin basis. Thus, it is possible for a particular interrupt to become invalid between a first time it has been polled and the next. Consequently, there is provided combinatorial logic unit 350a, 350b, 350c, 350d coupled between the interrupt request lines 242, 252, 262, 272 and the ISP interfaces 310a, 310b, 310c, 310d with a control line activated by the particular interrupt then being serviced. In one embodiment, combinatorial logic units 350a, 350b, 350c, and 350d comprise multiplexers, but it is to be understood that other types of combinatorial logic circuits may be used. Each combinatorial logic unit 350a, 350b, 350c, 350d returns a signal to its corresponding interface channel when the particular interrupt that is being serviced becomes invalid prior to the ISP interface channel returning the interrupt vector to the ISP.

Upon reception of the combinatorial logic unit's signal indicating deassertion of the interrupt, the appropriate ISP interface 310a, 310b, 310c, 310d sends a spurious interrupt vector to its associated ISP instead of the interrupt vector. The spurious interrupt vector points to a much shorter routine than a regular interrupt vector. For example, a typical interrupt service routine may include ISP instruction to save register state information, read information from a device which initiated the interrupt request, and then determine how to respond to the interrupt request. In contrast, a typical spurious interrupt routine may instruct the ISP to immediately return to the ISP's previous operations. Thus the ISP does not needlessly waste time executing an interrupt routine for an invalid interrupt request. The interrupt request is then cleared and the appropriate ISP interface 310a, 310b, 310c, 310d goes on to the next highest priority interrupt request.

The source of the interrupt request signals 242, 252, 262, 272 are indicated in FIG. 2 to be I/O devices 250, 260, 270, 280 or bus bridge 240. However, it is noted that in other embodiments, different interrupt request sources may exist. Some of these other sources may be part of the same integrated circuit device in which the programmable interrupt controller 230 is implemented. These sources located within the same integrated circuit are referred to as internal interrupt request sources. One example of such a source is a timer which generates one or more internal interrupt requests according to programmable time out conditions. Also, interrupt requests may come from the ISP interfaces 310a, 310b, 310c, 310d in response to interrupt requests by the corresponding ISP.

Different types of interrupt requests such as those described above may require different handling in the programmable interrupt controller 230. A portion of the unique interrupt identification code may be used to distinguish between different types of interrupt requests for this purpose. For example, in one embodiment, one portion of the unique interrupt identification code may be used to distinguish between interrupt requests from internal and external sources. Another portion may be used to distinguish between interrupts from a timer or from an ISP.

More particularly, the information field stored in memory unit 320 for timer and inter-processor interrupts may differ from the information field for external interrupts. The interrupt information field for such interrupts will include status information for the individual ISPs. For example, the field will indicate whether the interrupt for each receiving ISP is active, dispatched, or acknowledged, as well as the destination, priority, and vector for each interrupt.

The invention described in the above detailed description is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system, comprising:
   at least one interrupt service provider;
   at least one interrupt requester for requesting said at least one interrupt;
   a programmable interrupt controller intercoupling said at least one interrupt service provider and said at least one interrupt requestor; and
   an interrupt resource storage unit that is configured to store resource information associated with said at least one interrupt, wherein said programmable interrupt controller conveys an interrupt vector and said resource information to said at least one interrupt service provider, wherein said at least one interrupt service provider uses said resource information to save a selected subset of a current context state of said at least one interrupt service provider in response to said at least one interrupt, wherein said selected subset includes state information to be altered by said at least one interrupt service provider and excludes state information ot remain unaltered by said at least one interrupt service provider.

2. The computer system of claim 1, wherein said interrupt service provider includes a processor and an interrupt service routine.

3. The computer system of claim 1, wherein said interrupt resource storage device is configured to receive said resource information from said interrupt requestor.

4. The computer system of claim 1, wherein said programmable interrupt controller is configured to provide said interrupt vector and said resource information over a data bus.

5. The computer system of claim 4, wherein said data bus is a system data bus.

6. The computer system of claim 4, wherein said data bus is an interrupt information bus.

7. The computer system of claim 1 wherein said interrupt resource storage unit is integrated with said at least one interrupt requester.

8. The computer system of claim 1 wherein said interrupt resource storage unit is integrated with said programmable interrupt controller.

9. The computer system of claim 1 wherein said interrupt resource storage unit is part of a system memory.

10. The computer system of claim 1 wherein said at least one interrupt service provider further uses said resource information to selectively control and allocate system resources.

11. The computer system of claim 10 wherein said at least one interrupt service provider further uses said resource information to selectively control and allocate system resources by turning on and off said at least one interrupt requester.

12. The computer system of claim 10 wherein said at least one interrupt service provider further uses said information to selectively control and allocate system resources by providing clock speed information to said at least one interrupt requestor.

13. The computer system of claim 2 wherein said processor includes a plurality of registers defined within an instruction set for said processor, and wherein said processor is configured to save a selected subset of said plurality of registers according to said resource information in response to said at least one interrupt.

* * * * *